C. P. McDONALD.
TROLLEY WIRE CONNECTOR.
APPLICATION FILED MAY 11, 1914.
1,125,859.
Patented Jan. 19, 1915.
2 SHEETS—SHEET 1.
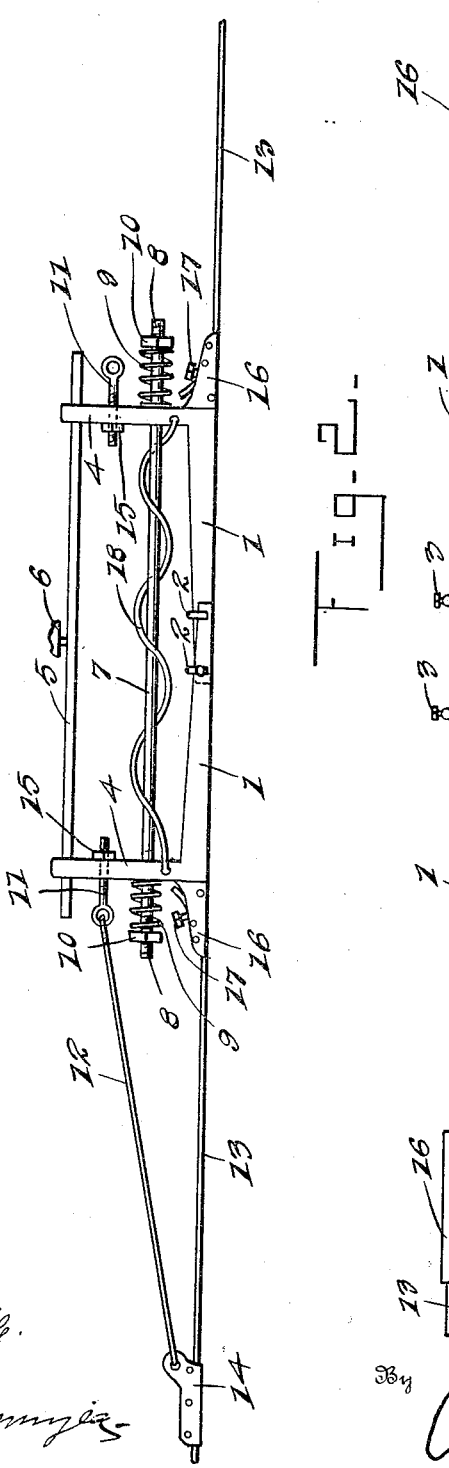
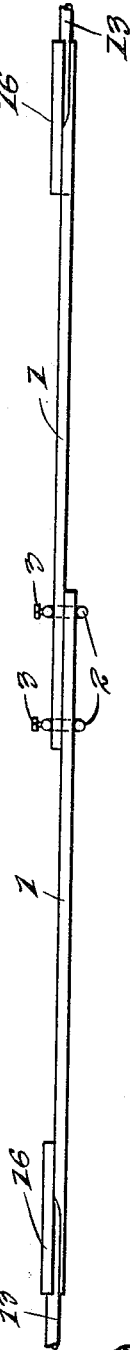
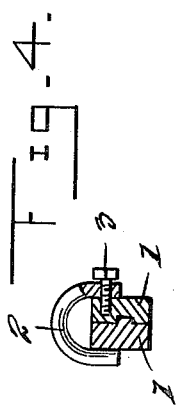
Witnesses
Inventor
C. P. McDonald,
By
Attorney

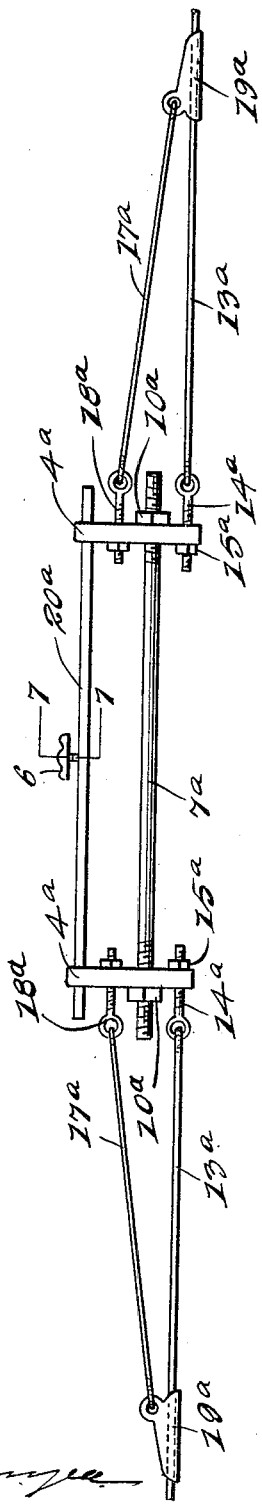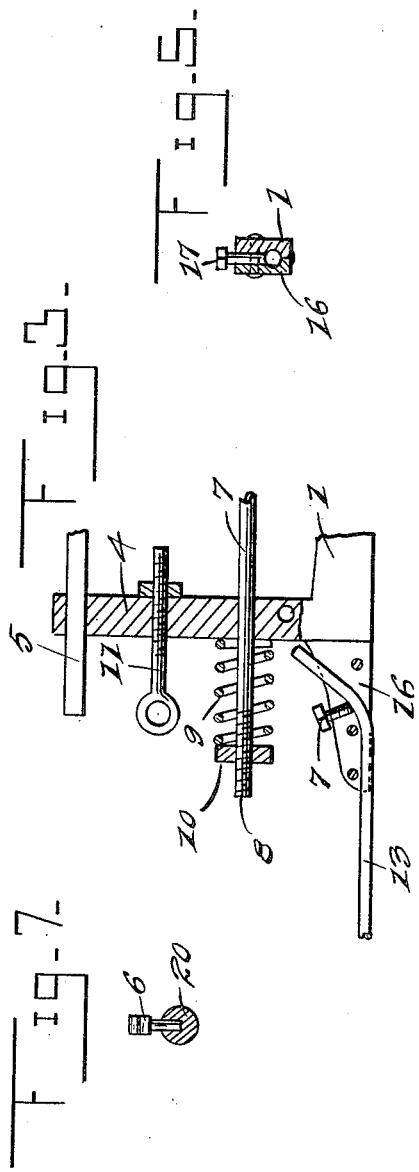

UNITED STATES PATENT OFFICE.

CHARLES P. McDONALD, OF GRAND JUNCTION, COLORADO.

TROLLEY-WIRE CONNECTOR.

1,125,859.  Specification of Letters Patent.  Patented Jan. 19, 1915.

Application filed May 11, 1914. Serial No. 837,921.

*To all whom it may concern:*

Be it known that I, CHARLES P. McDONALD, a citizen of the United States, residing at Grand Junction, in the county of Mesa and State of Colorado, have invented certain new and useful Improvements in Trolley-Wire Connectors, of which the following is a specification.

This invention relates to trolley wire connectors, and one of the principal objects of the invention is to provide a device of simple construction which will yield and contract to compensate for the expansion and contraction of a trolley wire during the changes in temperature between day and night.

Another object of the invention is to provide a trolley wire connector adapted to be supported upon the disconnected ends of a trolley wire between the poles for taking up the slack when the wires are expanded and for yielding to the action of the wires when they contract.

These and other objects may be attained by means of the construction illustrated in the accompanying drawings, in which—

Figure 1 is a side elevation of a trolley wire connector made in accordance with this invention and one of the anchor members being omitted, Fig. 2 is a top plan view of the two sliding connector bars looking at the bottom of the device shown in Fig. 1, Fig. 3 is a detail vertical section through one of the posts and springs, Fig. 4 is a detail view showing the manner of connecting the two sliding members together at their ends. Fig. 5 is a detail section showing the manner in which one end of the trolley wire is connected to one of the feet of one of the posts, Fig. 6 is a side elevation of a connector for messenger or span wires, and Fig. 7 is a detail section taken on the line 7—7 of Fig. 6.

Referring to the drawings, the numeral 1 designates the sliding connector members which overlap at their ends centrally and are provided with curved guide members 2, said guide members being connected to one of the sliding members 1 by means of set screws 3 which extend through the guides 2 and into one of the members 1, as shown more clearly in Fig. 4. Formed upon the outer ends of the members 2 are the upright posts 4, and extending through said posts near their outer ends is a bar 5 provided with a hanger 6.

Extending through the posts 4 at points between the bar 5 and the members 1 is a rod 7 having screw threaded ends 8. Said rod is provided with encircling springs 9, which springs bear at one end against the post 4 and at the opposite end against an adjusting nut 10.

Eye bolts 11 are secured to the posts 4 and connected to each of the eye bolts is an anchor rod 12, only one of which is shown in Fig. 1, but it will be understood that one is to be used upon either side connected to each of the bolts. Connected to the trolley wires 13 are the anchor plates 14 and the anchor rods 12 extend from the anchor 14 to the eye bolts 11, and said eye bolts are adapted to be adjusted by means of the nuts 15. The trolley wires 13 are secured in the clamp 16 by means of binding screws 17. A jumper for trolley connections 18 is wound spirally around the rod 17 and connected at its ends to the post 4 adjacent the terminal ends of the trolley wires 13.

Referring to Fig. 6 which shows the construction used for messenger wires which does not require the members 1 for the trolley wheel, the posts 4ª are spaced apart by means of the rod 7ª and the nuts 10ª mounted on the threaded ends of said rod. The messenger wires 13ª are connected at their ends to eye bolts 14ª adjusted to the posts 4ª by nuts 15ª, and the anchor members 17ª are connected by eye bolts 18ª to the anchors 19ª, while the suspension bar or rod 20ª is provided with a centrally disposed hanger 6.

From the foregoing it will be obvious that the springs 9 will compensate for any expansion or contraction of the trolley wires, and the members 1 will slide in and out to give and take with the expansion and contraction. The expansion bar 5 will also slide in the posts 4, thus taking up the slack in the trolley wire and to give to the contraction of the same.

Various changes may be made in the details of construction without departing from the spirit and scope of the invention as defined in the claims.

What is claimed is:—

1. A trolley wire connector comprising sliding members, posts on said members, a rod extending through said posts, and adjusting nuts, a suspension bar sliding freely through said posts, trolley wire ends connected to said posts, means for holding said wires in connection with said posts, and a jump wire spirally wound around said spring rod and connected to said posts.

2. A trolley wire connector comprising sliding members, posts on said members, a rod extending through said posts and provided with spiral springs, a suspension bar sliding freely through said posts, anchoring devices for the trolley ends and a suspension bar mounted to slide through said posts.

In testimony whereof I affix my signature in presence of two witnesses.

CHARLES P. McDONALD.

Witnesses:
 JOHN F. BILLIG,
 O. O. FELLOWS.

Copies of this patent may be obtained for five cents each, by addressing the "Commissioner of Patents, Washington, D. C."